US011936975B2

(12) United States Patent
Samson et al.

(10) Patent No.: US 11,936,975 B2
(45) Date of Patent: Mar. 19, 2024

(54) COMBINED COMPUTER VISION AND HUMAN VISION CAMERA SYSTEM

(71) Applicant: NIO Technology (Anhui) Co., Ltd., Hefei (CN)

(72) Inventors: Matthew L Samson, San Jose, CA (US); Bradley J. Angier, Santa Cruz, CA (US); Samir Agrawal, Milpitas, CA (US); Waylon Y. Chen, San Jose, CA (US); Luna Chen, San Jose, CA (US)

(73) Assignee: NIO Technology (Anhui) Co., Ltd., Hefei (CN)

( * ) Notice: Subject to any disclaimer, the term of this patent is extended or adjusted under 35 U.S.C. 154(b) by 13 days.

(21) Appl. No.: 17/318,109

(22) Filed: May 12, 2021

(65) Prior Publication Data

US 2022/0368819 A1    Nov. 17, 2022

(51) Int. Cl.
| | |
|---|---|
| *H04N 5/225* | (2006.01) |
| *G01S 13/931* | (2020.01) |
| *G01S 17/931* | (2020.01) |
| *G06T 5/00* | (2006.01) |
| *G06V 20/56* | (2022.01) |
| *G08G 1/16* | (2006.01) |
| *H04N 23/58* | (2023.01) |
| *H04N 23/698* | (2023.01) |

(52) U.S. Cl.
CPC ........... *H04N 23/58* (2023.01); *G01S 13/931* (2013.01); *G01S 17/931* (2020.01); *G06T 5/00* (2013.01); *G06V 20/56* (2022.01); *G08G 1/16* (2013.01); *H04N 23/698* (2023.01); *B60W 2420/42* (2013.01)

(58) Field of Classification Search
CPC . H04W 72/0426; H04W 76/12; H04W 76/27; H04W 84/047; H04W 36/0027; H04W 24/00; H04W 48/12; H04W 48/16; H04W 76/28; H04L 5/0098
See application file for complete search history.

(56) References Cited

U.S. PATENT DOCUMENTS

| | | |
|---|---|---|
| 5,982,549 A | 11/1999 | Kubala et al. |
| 7,893,985 B1 | 2/2011 | Ahiska et al. |
| (Continued) | | |

OTHER PUBLICATIONS

International Search Report and Written Opinion for International (PCT) Patent Application No. PCT/IB2022/000261, dated Sep. 29, 2022 15 pages.

*Primary Examiner* — Md N Haque
(74) *Attorney, Agent, or Firm* — Sheridan Ross, PC

(57) ABSTRACT

Embodiments include providing a computer vision video stream and a human vision video stream using a single camera. The camera can comprise a single, high-resolution senor and a wide-angle lens providing high resolution video having a wide aspect ratio field of view. The streams can be generated, wherein the computer vision video stream maintains the wide aspect ratio field of view and the human vision video stream comprises high resolution video. The computer vision video stream can be provided to a computer vision system, wherein the computer vision system uses the computer vision video stream as input for an automated process, and the human vision video stream can be provided to a system that displays the human vision video stream to a user.

16 Claims, 7 Drawing Sheets

(56) References Cited

U.S. PATENT DOCUMENTS

| | | |
|---|---|---|
| 2012/0248292 A1 | 10/2012 | Ozcan et al. |
| 2013/0314503 A1* | 11/2013 | Nix ........................ G06V 20/58 |
| | | 348/46 |
| 2014/0218468 A1 | 8/2014 | Gao et al. |
| 2020/0302645 A1* | 9/2020 | Parchami ............... G06N 3/084 |
| 2021/0023992 A1* | 1/2021 | Broggi ..................... B60R 1/00 |
| 2021/0139051 A1* | 5/2021 | Cirillo .................. G05D 1/0293 |
| 2022/0111839 A1* | 4/2022 | Jiang ...................... G06T 7/593 |

* cited by examiner

COMBINED COMPUTER VISION AND HUMAN VISION CAMERA SYSTEM

FIELD

Embodiments of the present disclosure relate generally to methods and systems for camera systems for combined use in computer vision and human vision systems and more particularly to an Advanced Driver-Assistance System (ADAS) camera system providing both computer vision and human vision suitable video streams.

BACKGROUND

Cameras for dedicated machine or human viewing exist. Current attempts at combined-viewing are low resolution and offer poor color accuracy. Whereas computer vision systems are primarily concerned with accurate imagery, human vision systems are concerned with "attractive" imagery. Imagery that looks attractive to a human can be poor for computer vision. Post-processing such as sharpening algorithms and contrast enhancement can yield artifacts that render frames useless to computer vision. Similarly, items of less importance for computer vision, such as color accuracy, offer a decreased user experience. Hence, there is a need for improved methods and systems for camera systems for combined use in computer vision and human vision systems.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
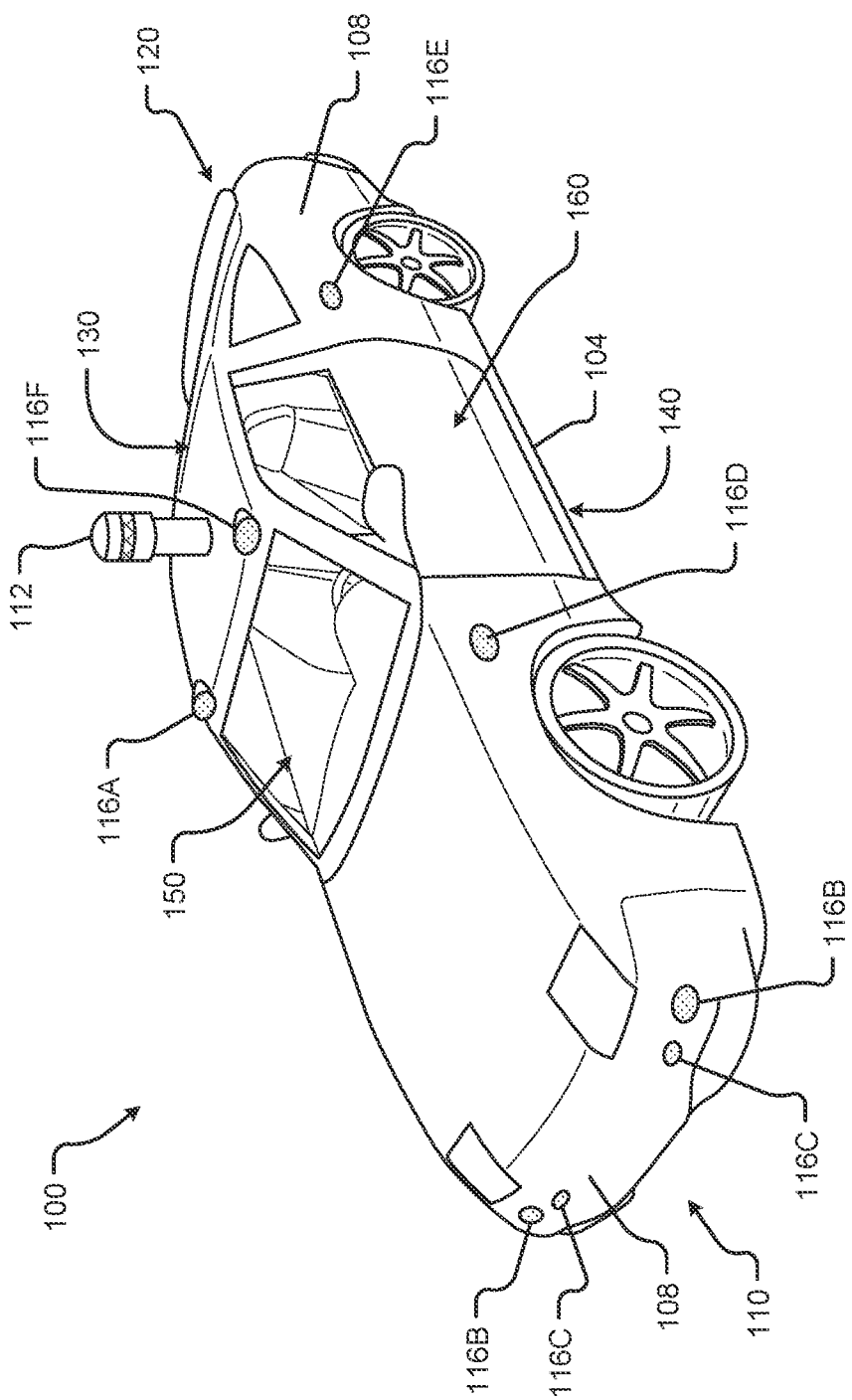
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
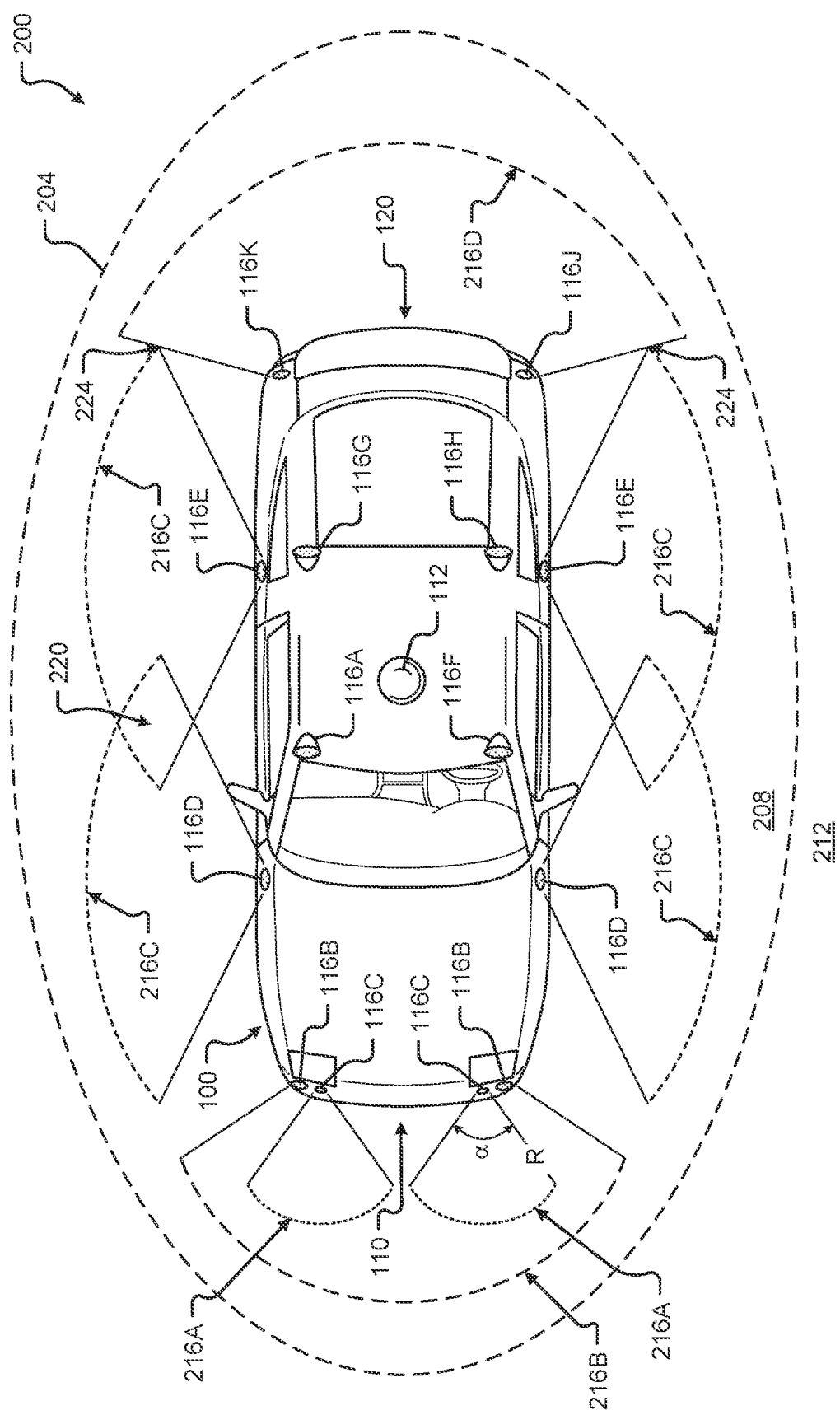
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally, or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally, or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
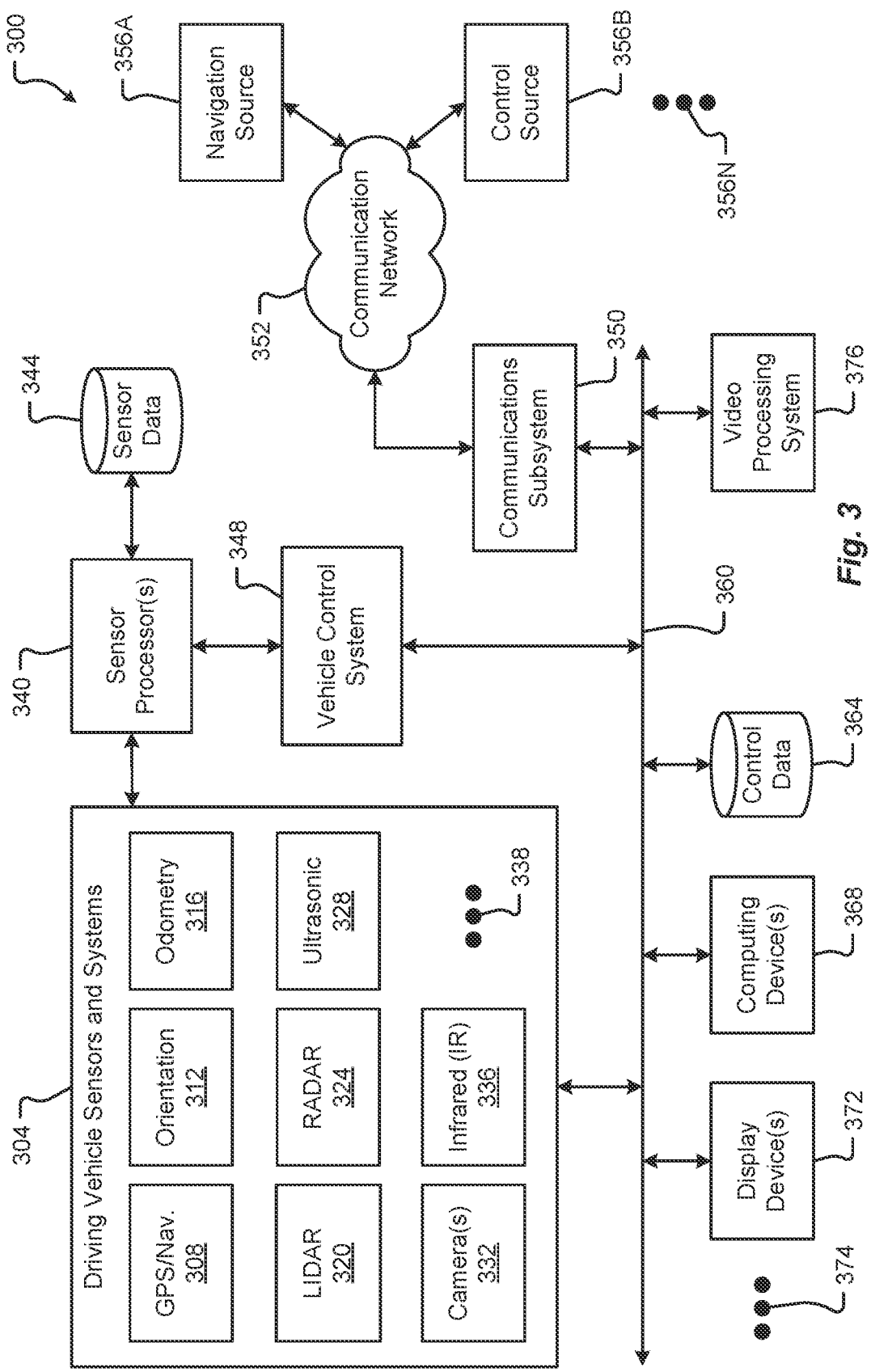
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally, or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally, or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random-access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random-access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

The environment 300 can also include a video processing system 376 communicatively coupled with bus 360. According to one embodiment, the video processing system can receive a video stream from a camera 332 over the bus 360. As will be described in greater detail below, the camera 332 can comprise a single, high-resolution senor and a wide-angle lens providing high resolution video having a wide aspect ratio field of view. From this video stream, the video processing system 376 can generate a computer vision video stream and a human vision video stream using a single camera. The computer vision video stream can maintain the wide aspect ratio field of view and thus more suitable for use by a computer vision system while the human vision video stream can comprise high resolution video having a field of view narrower than the computer vision video stream and thus more suitable for presentation to a human viewer. The computer vision video stream can be provided to a computer vision system, such as an Advanced Driver Assistance System (ADAS) for example, wherein the computer vision system uses the computer vision video stream as input for an automated process. The human vision video stream can be provided to a system that displays the human vision video stream to a user, such as a parking assist system for example.

Figure 4:
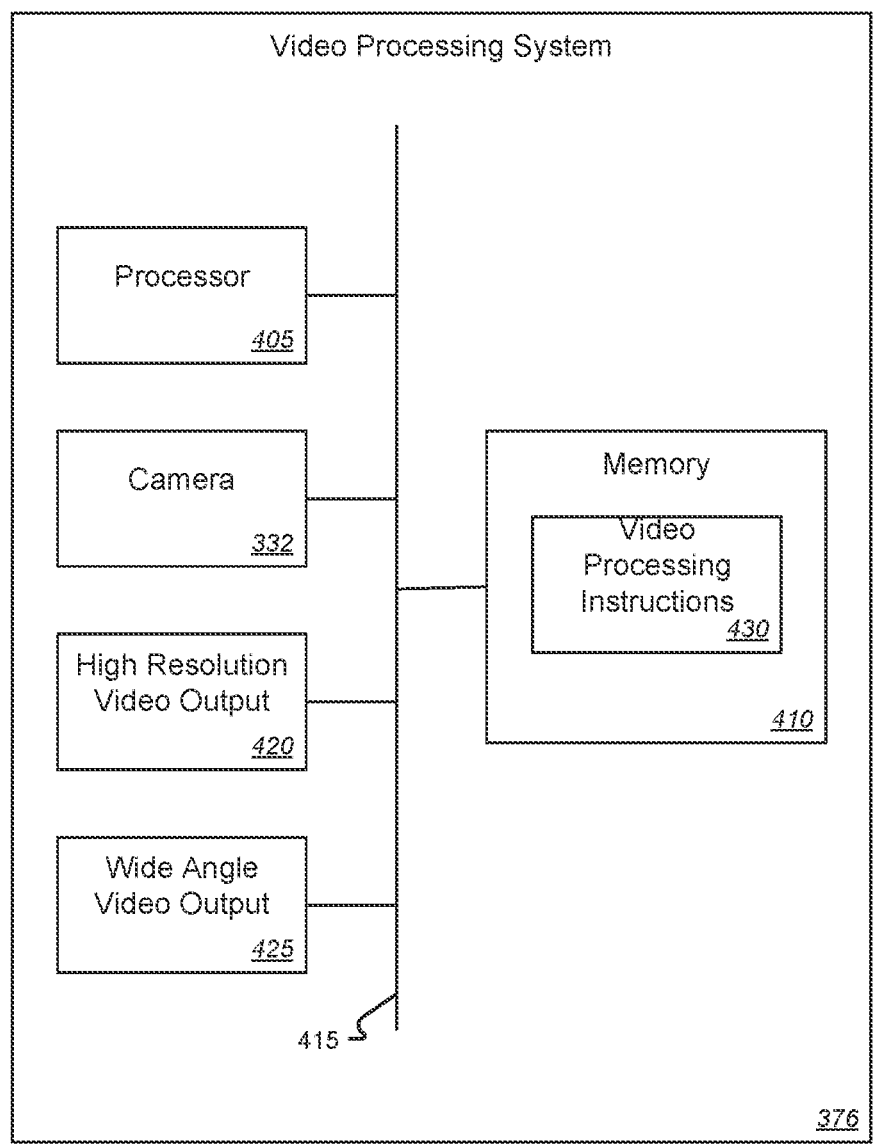
FIG. 4 is a block diagram illustrating elements of an exemplary video processing system according to one embodiment of the present disclosure.

FIG. 4 is a block diagram illustrating elements of an exemplary video processing system according to one embodiment of the present disclosure. As illustrated in this example, video processing system 376 can comprise a processor 405. The processor 405 may correspond to one or many computer processing devices. For instance, the processor 405 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 505 may be provided as a microprocessor, Central Processing Unit (CPU), or plurality of microprocessors that are configured to execute the instructions sets stored in a memory 410. Upon executing the instruction sets stored in memory 410, the processor 405 enables various functions of the video processing system 376 as described herein.

A memory 410 can be coupled with and readable by the processor 405 via a communications bus 415. The memory 410 may include any type of computer memory device or collection of computer memory devices. Non-limiting examples of memory 410 include Random Access Memory (RAM), Read Only Memory (ROM), flash memory, Electronically-Erasable Programmable ROM (EEPROM), Dynamic RAM (DRAM), etc. The memory 410 may be configured to store the instruction sets depicted in addition to temporarily storing data for the processor 405 to execute various types of routines or functions.

The processor 405 can also be coupled with a camera 332 via the communications bus 415. As introduced above, the processor can receive an input video stream from the camera and provide a human vision video stream via a high-resolution video output coupled with the communications bus 414 and a computer vision video stream via a wide-angle video output 425 also coupled with the communications bus 415.

The camera 332 can comprise a single, high-resolution senor and a wide-angle lens providing high resolution video having a wide aspect ratio field of view. For example, the FOV for autonomous driving can be roughly 180° H×180° V. While the FOV for human video can vary in general, a surround-view application of the vehicle may utilize a 150° H×180° V FOV, for example. Resolution for human video can be 2 MP, for example, which can roughly correspond to the number of pixels in Full HD (1920 H×1080V), though a different aspect ratio may be used. One other general difference between machine vision and human video can be the color accuracy. Algorithms can function independent of realistic representations of color while human views expect realistic color representations.

The memory 410 can store therein sets of instructions which, when executed by the processor 405, cause the processor 405 to process the video stream from the camera 332 as described herein. More specifically, the memory 410 can store therein a set of video processing instructions 430 which, when executed by the processor 405, can cause the processor 405 to receive, from the camera 332, the single video stream and generate, from the received single video stream, the computer vision video stream and the human vision video stream. The computer vision video stream can maintain the wide aspect ratio field of view and the human vision video stream can comprise high resolution video having a field of view narrower than the computer vision video stream.

Generating the human vision video stream can comprise cropping each frame of the human vision video stream from a center of a corresponding frame of the video stream received from the camera 332. In some cases, the video processing instructions 430 can cause the processor 405, prior to generating the human vision video stream, to determine whether to generate the human vision video stream. That is, generating the human vision video stream may be done selectively, e.g., based on a mode such as parking assist mode being activated, on demand, etc. In such cases, the video processing instructions 430 can cause the processor 405 to crop each frame of the human vision video stream from a center of a corresponding frame of the video stream received from the camera 332 in response to determining to generate the human vision video stream.

In some cases, the video processing instructions 430 can cause the processor 405 to post-process the computer vision video stream based on requirements of the computer vision system. Similarly, the video processing instructions 430 can additionally or alternatively post-process the human vision video stream based on requirements of the system that displays the human vision video stream. The video processing instructions 430 can then cause the processor 405 to provide the computer vision video stream to a computer vision system that uses the computer vision video stream as input for an automated process and provide the human vision video stream to a system that displays the human vision video stream to a user. For example, the computer vision system can comprise an Advanced Driver-Assistance System (ADAS) of an automobile. The system that displays the human vision video stream can comprise a parking assist system of an automobile, for example.

Figure 5:
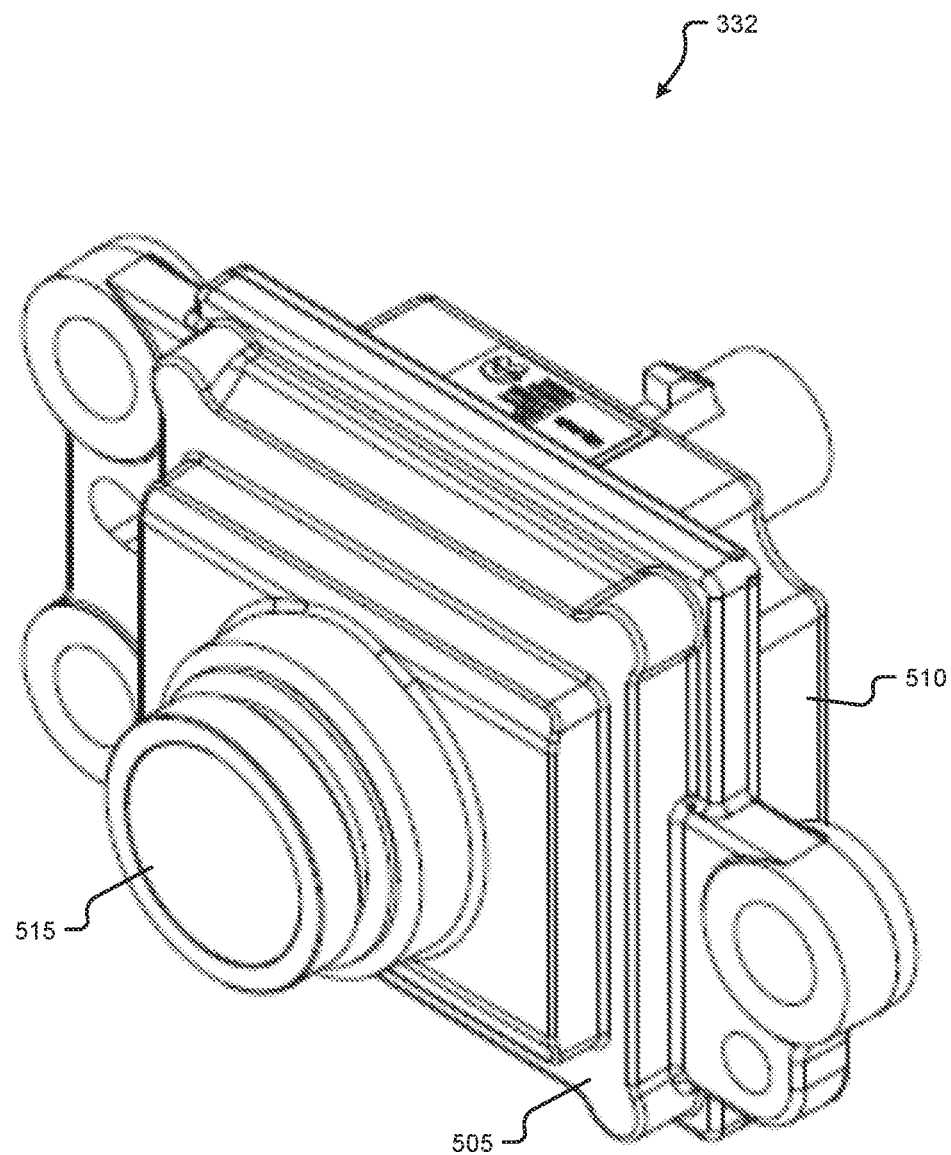
FIG. 5 is an isometric view of an exemplary camera according to one embodiment of the present disclosure.

FIG. 5 is an isometric view of an exemplary camera according to one embodiment of the present disclosure. As illustrated in this example, the camera 332 can comprise a front housing 505 and a back housing 510 joined and held together by a set of screws or other fasteners as will be described below with reference to FIG. 6. Also, as will be described below with reference to FIG. 6, the front housing 505 and back housing 510 can enclose a set of internal components such as a camera sensor, a Printed Circuit Board (PCB), etc. The lens 515 of the camera can be mounted on and disposed within the front housing 505 of the camera 332.

Figure 6:
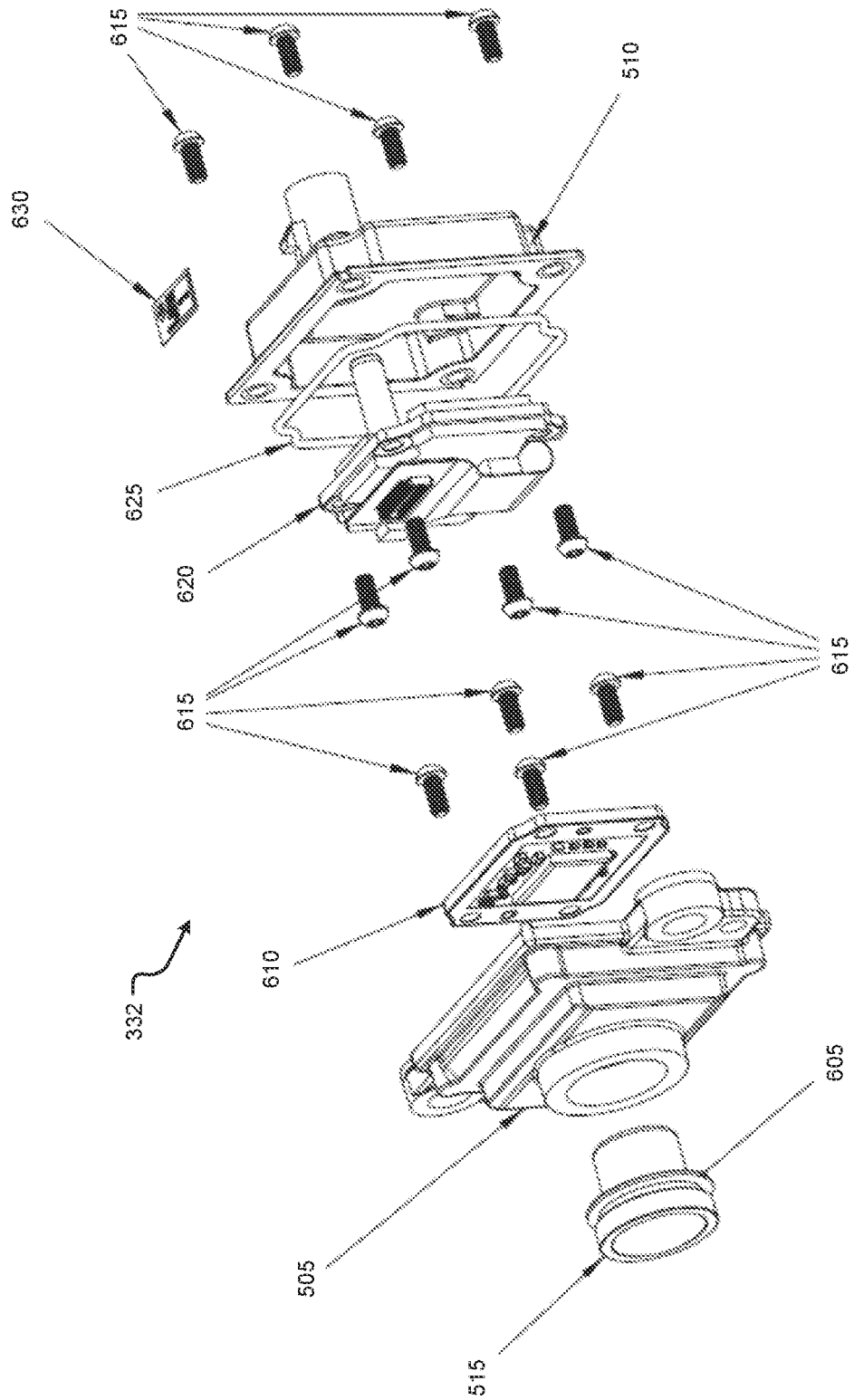
FIG. 6 is an exploded isometric view of an exemplary camera according to one embedment of the present disclosure.

FIG. 6 is an exploded isometric view of an exemplary camera according to one embedment of the present disclosure. As illustrated in this example, the lens 515 can be mounted on and affixed to the front housing 505 by a ring of adhesive 605 or other fastener. The camera can further comprise an image sensor 610 mounted to the front housing 505 behind the lens 515, a set of screws 615 or other fasteners to secure and connect the parts of the camera 332, an interface PCB 620 providing an electrical interface for the image sensor 610, an o-ring 625 or seal to environmentally seal the enclosure created by fastening the back housing 510 to the front housing 505, and a QR or other label 630 for identifying the camera 332. For example, and according to one embodiment, the image sensor can be 4k, 3840 H×2160V and the lens can be designed for 1-2 MP with a diagonal FOV of 210°. However, in other implementations, other sensors and/or lens can be used without departing from the scope of the present disclosure.

Figure 7:
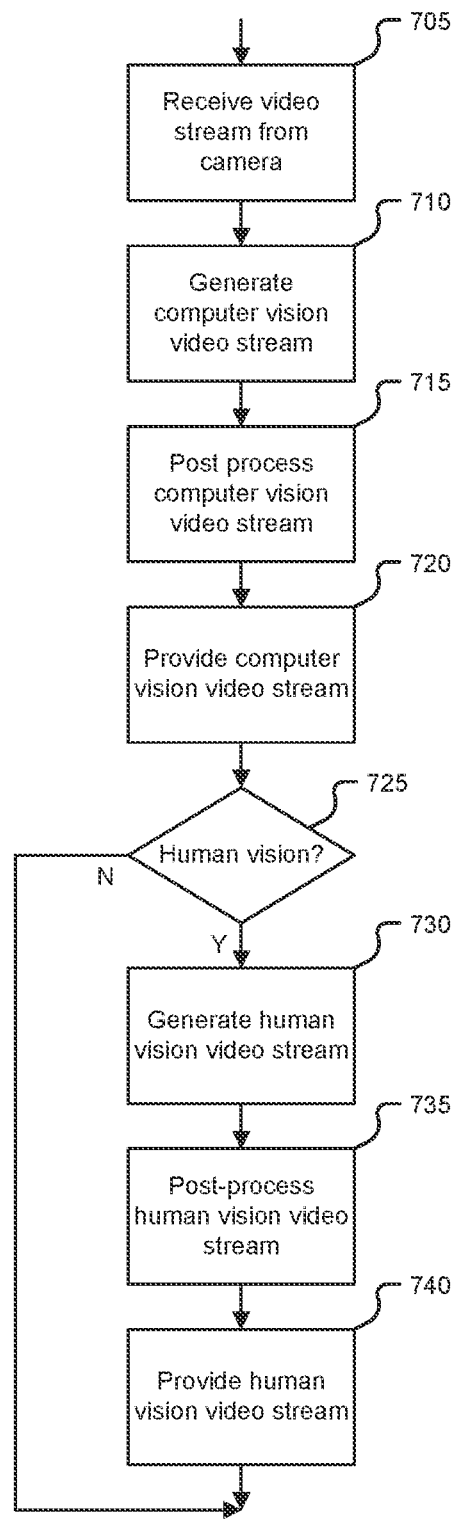
FIG. 7 is a flowchart illustrating an exemplary process for utilizing a camera system according to one embodiment of the present disclosure.

FIG. 7 is a flowchart illustrating an exemplary process for utilizing a camera system according to one embodiment of the present disclosure. As illustrated in this example, providing a computer vision video stream and a human vision video stream using a single camera can begin with receiving 705, from the camera, a video stream. The camera can comprise a single, high-resolution senor and a wide-angle lens providing high resolution video having a wide aspect ratio field of view. The computer vision video stream can be generated 710 from the video stream received from the camera. The computer vision video stream can maintain the wide aspect ratio field of view of the wide-angle lens. Optionally, the computer vision video stream can be post-processed 715 based on requirements of the computer vision system. The computer vision video stream can then be provided 720 to a computer vision system which uses the computer vision video stream as input for an automated process. For example, the computer vision system can comprise an ADAS of an automobile. In some cases, the automated process can comprise autonomous operation of a vehicle.

In some cases, a determination 725 can be made as to whether to generate the human vision video stream. For example, such a determination 725 can be made based on an operating mode, such as parking mode etc., being enabled. In response to determining 725 to generate the human vision video stream, or in case no such determination 725 is made, the human vision video stream can be generated 730 by cropping each frame of the human vision video stream from a center of a corresponding frame of the video stream received from the camera. Thus, the human vision video stream can comprise high resolution video having a field of view narrower than the computer vision video stream. In some implementations, the camera can comprise one of a plurality of cameras of a vehicle, each camera installed in a different location on the vehicle. In such cases, video from each camera can be cropped, and an amount of the cropping, an aspect ratio of the cropping, and a center of the video stream received from each camera can be different for each camera and can be optimized for the human vision video stream.

In some cases, the human vision video stream can be post-processed 735 based on requirements of the system that displays the human vision video stream. The human vision video stream can then be provided 740 to a system that displays the human vision video stream to a user. For example, the system that displays the human vision video stream comprises a parking assist system of an automobile.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s)

or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for providing a computer vision video stream and a human vision video stream using a single camera, the method comprising receiving, by a video processing system, from the camera, a video stream, wherein the camera comprises a single, high-resolution senor and a wide-angle lens providing high resolution video having a wide aspect ratio field of view, generating, by the video processing system, the computer vision video stream and the human vision video stream, wherein the computer vision video stream maintains the wide aspect ratio field of view and the human vision video stream comprises high resolution video having a field of view narrower than the computer vision video stream, providing, by the video processing system, the computer vision video stream to a computer vision system, wherein the computer vision system uses the computer vision video stream as input for an automated process, and providing, by the video processing system, the human vision video stream to a system that displays the human vision video stream to a user.

Aspects of the above method include generating the human vision video stream by cropping each frame of the human vision video stream from a center of a corresponding frame of the video stream received from the camera.

Aspects of the above method include generating the human vision video stream by determining whether to generate the human vision video stream and wherein cropping each frame of the human vision video stream from a center of a corresponding frame of the video stream received from the camera is performed only in response to determining to generate the human vision video stream.

Aspects of the above method include wherein the camera comprises one of a plurality of cameras of a vehicle, each camera installed in a different location on the vehicle, wherein video from each camera is cropped, and wherein an amount of the cropping, an aspect ratio of the cropping, and a center of the video stream received from each camera is different for each camera and are optimized for the human vision video stream.

Aspects of the above method include wherein generating the computer vision video stream further comprises post-processing the computer vision video stream based on requirements of the computer vision system.

Aspects of the above method include wherein generating the human vision video stream further comprises post-processing the human vision video stream based on requirements of the system that displays the human vision video stream.

Aspects of the above method include wherein the computer vision system comprises an Advanced Driver-Assistance System (ADAS) of an automobile.

Aspects of the above method include wherein the system that displays the human vision video stream comprises a parking assist system of an automobile.

Aspects of the above method include wherein the automated process comprises autonomous operation of a vehicle.

Embodiments include a video processing system comprising: a camera, a processor coupled with the camera, and a memory coupled with and readable by the processor and storing therein a set of instructions which, when executed by the processor, causes the processor to provide a computer vision video stream and a human vision video stream using a single input stream from the camera by receiving, from the camera, the single video stream, wherein the camera comprises a single, high-resolution senor and a wide-angle lens providing high resolution video having a wide aspect ratio field of view, generating, from the received single video stream, the computer vision video stream and the human vision video stream, wherein the computer vision video stream maintains the wide aspect ratio field of view and the human vision video stream comprises high resolution video having a field of view narrower than the computer vision video stream, providing the computer vision video stream to a computer vision system, wherein the computer vision system uses the computer vision video stream as input for an automated process, and providing the human vision video stream to a system that displays the human vision video stream to a user.

Aspects of the above video processing system include wherein generating the human vision video stream comprises cropping each frame of the human vision video stream from a center of a corresponding frame of the video stream received from the camera and wherein generating the human vision video stream further comprises determining whether to generate the human vision video stream and wherein cropping each frame of the human vision video stream from a center of a corresponding frame of the video stream received from the camera is performed only in response to determining to generate the human vision video stream.

Aspects of the above video processing system include wherein the camera comprises one of a plurality of cameras of a vehicle, each camera installed in a different location on the vehicle, wherein video from each camera is cropped, and wherein an amount of the cropping, an aspect ratio of the cropping, and a center of the video stream received from each camera is different for each camera and are optimized for the human vision video stream.

Aspects of the above video processing system include wherein generating the computer vision video stream further comprises post-processing the computer vision video stream based on requirements of the computer vision system.

Aspects of the above video processing system include wherein generating the human vision video stream further comprises post-processing the human vision video stream based on requirements of the system that displays the human vision video stream.

Aspects of the above video processing system include wherein the computer vision system comprises an Advanced Driver-Assistance System (ADAS) of an automobile.

Aspects of the above video processing system include wherein the system that displays the human vision video stream comprises a parking assist system of an automobile.

Embodiments include a vehicle comprising a camera, an Advanced Driver-Assistance System (ADAS), a parking assist system; and a video processing system comprising a processor coupled with the camera, the ADAS, and the parking assist system and a memory coupled with and readable by the processor and storing therein a set of instructions which, when executed by the processor, causes the processor to provide a computer vision video stream and a human vision video stream using a single input stream from the camera by receiving, from the camera, the single video stream, wherein the camera comprises a single, high-resolution senor and a wide-angle lens providing high resolution video having a wide aspect ratio field of view, generating, from the received single video stream, the computer vision video stream and the human vision video stream, wherein the computer vision video stream maintains the wide aspect ratio field of view and the human vision video stream comprises high resolution video having a field of view narrower than the computer vision video stream, providing, to the ADAS, the computer vision video stream to a computer vision system, and providing, to the parking assist system, the human vision video stream to a system that displays the human vision video stream to a user.

Aspects of the above vehicle include wherein generating the human vision video stream comprises cropping each frame of the human vision video stream from a center of a corresponding frame of the video stream received from the camera.

Aspects of the above vehicle include wherein generating the human vision video stream further comprises determining whether to generate the human vision video stream and wherein cropping each frame of the human vision video stream from a center of a corresponding frame of the video stream received from the camera is performed only in response to determining to generate the human vision video stream.

Aspects of the above vehicle include wherein generating the computer vision video stream further comprises post-processing the computer vision video stream based on requirements of the computer vision system and wherein generating the human vision video stream further comprises post-processing the human vision video stream based on requirements of the system that displays the human vision video stream.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for providing a computer vision video stream and a human vision video stream using a single camera, the method comprising:

receiving, by a video processing system, from the single camera, a video stream, wherein the single camera comprises a single, high-resolution senor and a wide-angle lens providing high resolution video having a wide aspect ratio field of view;

cropping, by the video processing system, each frame of the human vision video stream from a center of a corresponding frame of the video stream received from the single camera, wherein the single camera comprises one of a plurality of cameras of a vehicle, each camera installed in a different location on the vehicle, wherein video from each camera is cropped, and wherein an amount of the cropping, an aspect ratio of the cropping, and a center of the video stream received from each camera is different for each camera and are optimized for the human vision video stream;

generating, by the video processing system, the computer vision video stream and the human vision video stream from the cropping of each frame of the human vision video stream from the center of the corresponding frame of the video stream received from the single camera, wherein the computer vision video stream maintains the wide aspect ratio field of view and the human vision video stream comprises high resolution video;

providing, by the video processing system, the computer vision video stream to a computer vision system, wherein the computer vision system uses the computer vision video stream as input for an automated process; and providing, by the video processing system, the human vision video stream to a system that displays the human vision video stream to a user.

2. The method of claim 1, wherein generating the human vision video stream further comprises determining whether to generate the human vision video stream and wherein cropping each frame of the human vision video stream from a center of a corresponding frame of the video stream received from the single camera is performed only in response to determining to generate the human vision video stream.

3. The method of claim 1, wherein generating the computer vision video stream further comprises post-processing the computer vision video stream based on requirements of the computer vision system.

4. The method of claim 1, wherein generating the human vision video stream further comprises post-processing the human vision video stream based on requirements of the system that displays the human vision video stream.

5. The method of claim 1, wherein the computer vision system comprises an Advanced Driver-Assistance System (ADAS) of an automobile.

6. The method of claim 1, wherein the system that displays the human vision video stream comprises a driver assist system of an automobile.

7. The method of claim 1, wherein the automated process comprises autonomous operation of a vehicle.

8. A video processing system comprising:
a camera;
a processor coupled with the camera; and
a memory coupled with and readable by the processor and storing therein a set of instructions which, when executed by the processor, causes the processor to provide a computer vision video stream and a human vision video stream using a single input video stream from the camera by:
  receiving, from the camera, the single input video stream, wherein the camera comprises a single, high-resolution senor and a wide-angle lens providing high resolution video having a wide aspect ratio field of view;
  cropping each frame of the human vision video stream from a center of a corresponding frame of the single input video stream received from a single camera, wherein the single camera comprises one of a plurality of cameras of a vehicle, each camera installed in a different location on the vehicle, wherein video from each camera is cropped, and wherein an amount of the cropping, an aspect ratio of the cropping, and a center of the single input video stream received from each camera is different for each camera and are optimized for the human vision video stream;
  generating, from the received single input stream, the computer vision video stream and the human vision video stream from the cropping of each frame of the human vision video stream from the center of the corresponding frame of the single input video stream received from the single camera, wherein the computer vision video stream maintains the wide aspect ratio field of view and the human vision video stream comprises high resolution video,
  providing the computer vision video stream to a computer vision system, wherein the computer vision system uses the computer vision video stream as input for an automated process; and
  providing the human vision video stream to a system that displays the human vision video stream to a user.

9. The video processing system of claim 8, wherein generating the human vision video stream further comprises determining whether to generate the human vision video stream and wherein cropping each frame of the human vision video stream from a center of a corresponding frame of the single input stream received from the camera is performed only in response to determining to generate the human vision video stream.

10. The video processing system of claim 9, wherein generating the computer vision video stream further comprises post-processing the computer vision video stream based on requirements of the computer vision system.

11. The video processing system of claim 9, wherein generating the human vision video stream further comprises post-processing the human vision video stream based on requirements of the system that displays the human vision video stream.

12. The video processing system of claim 9, wherein the computer vision system comprises an Advanced Driver-Assistance System (ADAS) of an automobile.

13. The video processing system of claim 9, wherein the system that displays the human vision video stream comprises a parking assist system of an automobile.

14. A vehicle comprising:
a camera;
an Advanced Driver-Assistance System (ADAS);
a parking assist system; and
a video processing system comprising a processor coupled with the camera, the ADAS, and the parking assist system and a memory coupled with and readable by the processor and storing therein a set of instructions which, when executed by the processor, causes the processor to provide a computer vision video stream and a human vision video stream using a single input video stream from the camera by:
  receiving, from the camera, the single input video stream, wherein the camera comprises a single, high-resolution senor and a wide-angle lens providing high resolution video having a wide aspect ratio field of view;
  cropping each frame of the human vision video stream from a center of a corresponding frame of the single input video stream received from a single camera, wherein the single camera comprises one of a plurality of cameras of a vehicle, each camera installed in a different location on the vehicle, wherein video from each camera is cropped, and wherein an amount of the cropping, an aspect ratio of the cropping, and a center of the single input video stream received from each camera is different for each camera and are optimized for the human vision video stream;
  generating, from the received single input stream, the computer vision video stream and the human vision video stream from the cropping of each frame of the human vision video stream from the center of the corresponding frame of the single input video stream received from the single camera, wherein the computer vision video stream maintains the wide aspect ratio field of view and the human vision video stream comprises high resolution video;

providing, to the ADAS, the computer vision video stream to a computer vision system; and providing, to the parking assist system, the human vision video stream to a system that displays the human vision video stream to a user.

15. The vehicle of claim 14, wherein generating the human vision video stream further comprises determining whether to generate the human vision video stream and wherein cropping each frame of the human vision video stream from a center of a corresponding frame of the single input stream received from the camera is performed only in response to determining to generate the human vision video stream.

16. The vehicle of claim 14, wherein generating the computer vision video stream further comprises post-processing the computer vision video stream based on requirements of the computer vision system and wherein generating the human vision video stream further comprises post-processing the human vision video stream based on requirements of the system that displays the human vision video stream.

\* \* \* \* \*